United States Patent [19]

Seidel

[11] Patent Number: 4,669,700
[45] Date of Patent: Jun. 2, 1987

[54] PILOT OPERATED VALVE
[75] Inventor: William E. Seidel, Rockford, Ill.
[73] Assignee: Sundstrand Corporation, Rockford, Ill.
[21] Appl. No.: 733,050
[22] Filed: May 13, 1985
[51] Int. Cl.⁴ ............................................. F16K 31/12
[52] U.S. Cl. .................................... 251/28; 251/61.2; 137/625.66
[58] Field of Search ................... 251/335.3, 61.2, 61.3, 251/61.5, 28, 31; 137/625.64, 625.66, 244, 513.3, 82

[56] References Cited

U.S. PATENT DOCUMENTS

| 2,013,766 | 9/1935 | Sandvoss . |
| 2,965,128 | 12/1960 | Silver . |
| 3,366,315 | 1/1968 | Alberani . |
| 3,367,367 | 2/1968 | Moriyama et al. ............. 137/625.66 |
| 3,435,626 | 4/1969 | Wile et al. ............................... 251/28 |
| 3,572,359 | 3/1971 | Weise . |
| 3,769,998 | 11/1973 | Avant . |
| 4,226,258 | 10/1980 | Nakanishi .............................. 251/31 |
| 4,238,109 | 12/1980 | Powers .................................... 251/28 |
| 4,269,028 | 5/1981 | Hattori ................................... 251/31 |
| 4,497,335 | 2/1985 | Masuda .............................. 251/61.5 |

FOREIGN PATENT DOCUMENTS 955396  4/1964  United Kingdom .......... 137/625.64

Primary Examiner—Samuel Scott
Assistant Examiner—Noah Kamen
Attorney, Agent, or Firm—Wood, Dalton, Phillips, Mason & Rowe

[57] ABSTRACT

To minimize friction losses and hysteresis losses while providing convenient adjustability without alignment problems in a pilot operated valve, a poppet is disposed between two ports in a valve body and is biased by means of a spaced diaphragm assembly. The poppet is axially positionable in the body in a nearly zero lapped position relative to the first and second ports. In cooperation with the diaphragm assembly, fluid pressure signals delivered to three separate chambers are utilized to control valve opening ramp rate, pressure variations within the limit of a set point, and adjustability of the set point.

16 Claims, 3 Drawing Figures

PILOT OPERATED VALVE

FIELD OF THE INVENTION

This invention relates to a pilot operated valve, and more specifically, to a pilot operated valve that may be employed in a pressure regulating system.

BACKGROUND OF THE INVENTION

Pilot operated valves have long been used in a variety of applications. One application is that of pressure regulation wherein it is desirable to control the position of a valve dependent upon the relative pressures on the inlet and outlet sides of the valve. Most frequently, this is accomplished by means of inlet and outlet pilot signals.

In a common application, the pilot operated valve controls the pressure applied to a valve actuator by adjusting a variable orifice with a poppet. The position of the poppet relative to the orifice is determined, at least in part, by the relative pressure on the inlet and outlet sides of the valve, i.e., by the inlet and outlet pilot signals. In addition, the poppet will typically be biased toward a closed position relative to the variable orifice.

In making a pilot operated valve of this type, a problem is to provide convenient adjustability for meeting different operating conditions. It is also difficult to minimize leakage and optimize response time since alignment problems are usually presented and the constructions of such valves are such that valve opening and closing times during transients are inherently long. Moreover, pilot operated valves are usually difficult to manufacture, assemble and adjust.

While overcoming problems of this type, it is also desirable to provide a construction wherein friction losses and hysteresis losses are minimized. It is also desirable that the valve system have rapid dynamic response and adjustability in more than one area. Further, it is desirable that the valve system be of modular construction and compact size for ready connection to an actuator housing.

The present invention is directed to overcoming the above stated problems and accomplishing the stated objects.

SUMMARY OF THE INVENTION

It is the principal object of the invention to provide a new and improved pilot operated valve for use in a pressure regulating system. More specifically, it is an object of the invention to provide a pilot operated valve which provides actuator pressure control by adjusting a variable orifice with a poppet where there are low friction and hysteresis losses, leakage is minimized, and response time is optimized. It is likewise an object of the invention to provide a pilot operated valve having convenient adjustability and a modular construction in which alignment problems are avoided by separating close tolerance components from loose tolerance components.

An exemplary embodiment of the invention achieves the foregoing objects in a pilot operated valve having a valve body with a cavity in the body. A first port at one end of the cavity is generally concentric with and axially spaced from a second port at the other end of the cavity. With this arrangement, one of the ports is adapted to be subjected to a fluid under pressure for biasing a poppet in the cavity toward the other of the ports.

In the exemplary embodiment, the poppet extends between and is axially movable relative to the first and second ports. A first end of the poppet is adapted for lapped sealing engagement with the first port and a second end thereof is adapted for lapped sealing engagement with the second port. More specifically, the poppet is axially positionable in the cavity in a nearly zero lapped position relative to the first and second ports.

Finally, the exemplary embodiment includes means in the body for biasing the poppet in a direction opposite the direction of biasing of the fluid and, in a steady state condition in which the pressure applied to the poppet by the biasing means and fluid are balanced, the poppet accommodates flow of a portion of the fluid from the one of the ports, through the cavity, and through the other of the ports.

In a preferred embodiment, the biasing means includes a displaceable diaphragm assembly having first and second flexible diaphragm members spaced from one another and the poppet. The diaphragm assembly and poppet are operatively joined together so that displacement of the diaphragm assembly causes the poppet to move in response thereto. By reason of the fact that the loose tolerance diaphragm assembly is spaced from the close tolerance poppet, alignment problems are avoided.

More specifically, the valve system includes three chambers in the body all of which are defined in part by the first and second diaphragm members. The first chamber is adapted for communication with a first fluid pressure signal acting on a first one of the diaphragm members in one direction relative to the poppet to cause the diaphragm assembly to be displaced in a first direction. The second chamber is adapted for communication with a second lfuid pressure signal acting on the other one of the diaphragm members in the opposite direction relative to the poppet to cause the diaphragm assembly to be displaced in the opposite direction. The third chamber is adapted for communication with a third fluid pressure signal acting on the other one of the diaphragm members in the same direction as the first fluid pressure signal acts on the first one of the diaphragm members to cause the diaphragm assembly to be displaced in the first direction relative to the poppet. With the three chambers being isolated from the cavity and one another, the first, second and third fluid pressure signals control the position of the poppet relative to the first and second ports through the diaphragm assembly.

To provide low friction and hysteresis losses, the diaphragm assembly utilizes elastomeric rolling diaphragm members.

To minimize leakage, the valve system utilizes a nearly zero lapped close tolerance poppet.

To provide for convenient adjustability and easy assembly, a modular construction utilizing shims is provided.

Other subjects and advantages will become apparent form the following specification taken in connection with the accompanying drawings.

DESCRIPTION OF THE PREFERRED EMBODIMENT

Figure 1:
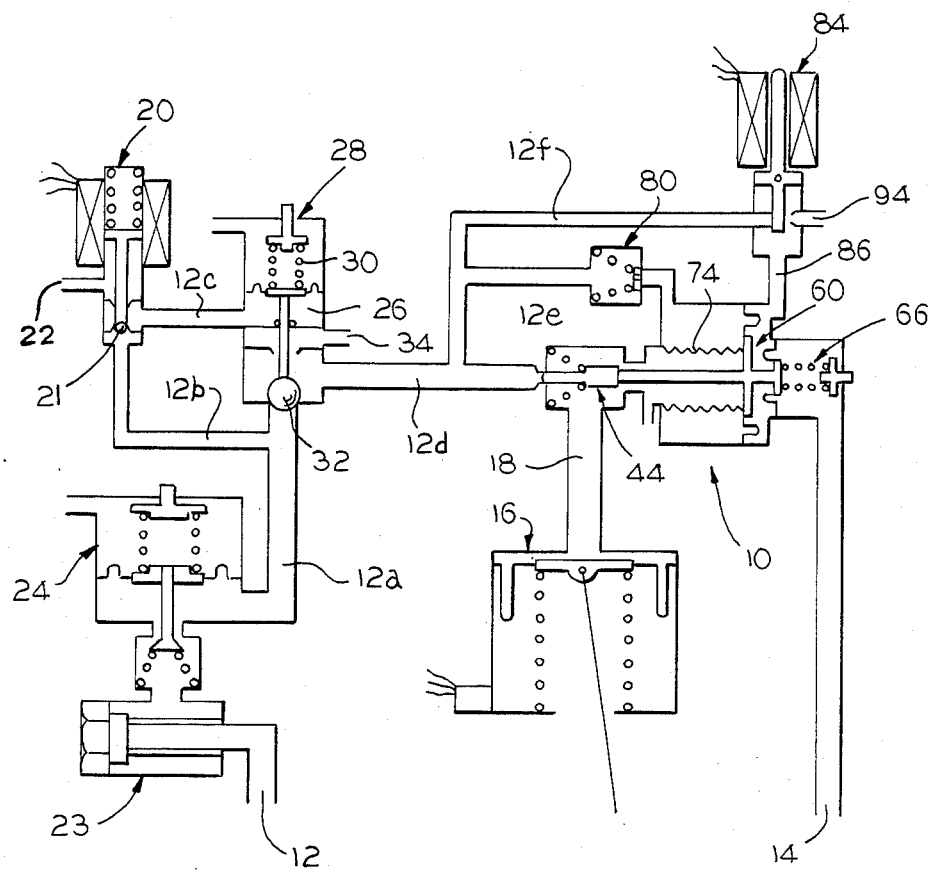
FIG. 1 is a schematic view of a pressure regulating system utilizing a pilot operated valve according to the invention.

An exemplary embodiment of a pressure regulating system utilizing a pilot operated valve 10 made according to the invention is illustrated in FIG. 1. The system includes an inlet pilot signal line 12 adapted to carry an inlet pilot signal to the pilot operated valve 10 and an outlet pilot signal line 14 adapted to carry an outlet pilot signal to the pilot operated valve. In addition, the system includes an actuator 16 responsive to the inlet pilot signal through a line 18 in communication with the pilot operated valve 10.

During the start-up of the system, an on-off solenoid 20 is energized to move the valve ball 21 from the closed position illustrated to an open position closing the vent 22 after which fluid flows from the inlet pilot signal line 12 through a filter 23 and is regulated by a pressure regulator-relief valve 24. This fluid flow then flows through the intermediate lines 12a, 12b and 12c to pressurize the diaphragm chamber 26 of the on-off valve 28 which overcomes the spring 30 to cause the valve ball 32 to move from the closed position illustrated to an open position closing the vent 34. At this point, the fluid flows through the intermediate lines 12a and 12d to supply fluid pressure from the inlet pilot signal line 12 to the pilot operated valve 10.

For a more complete understanding of the operation of a control valve utilizing the pilot operated valve 10, reference is made to my copending application Ser. No. 758,760, filed July 15, 1985 (Attorney's Docket No. BO1965), the teachings of which are incorporated by reference.

Figure 2:
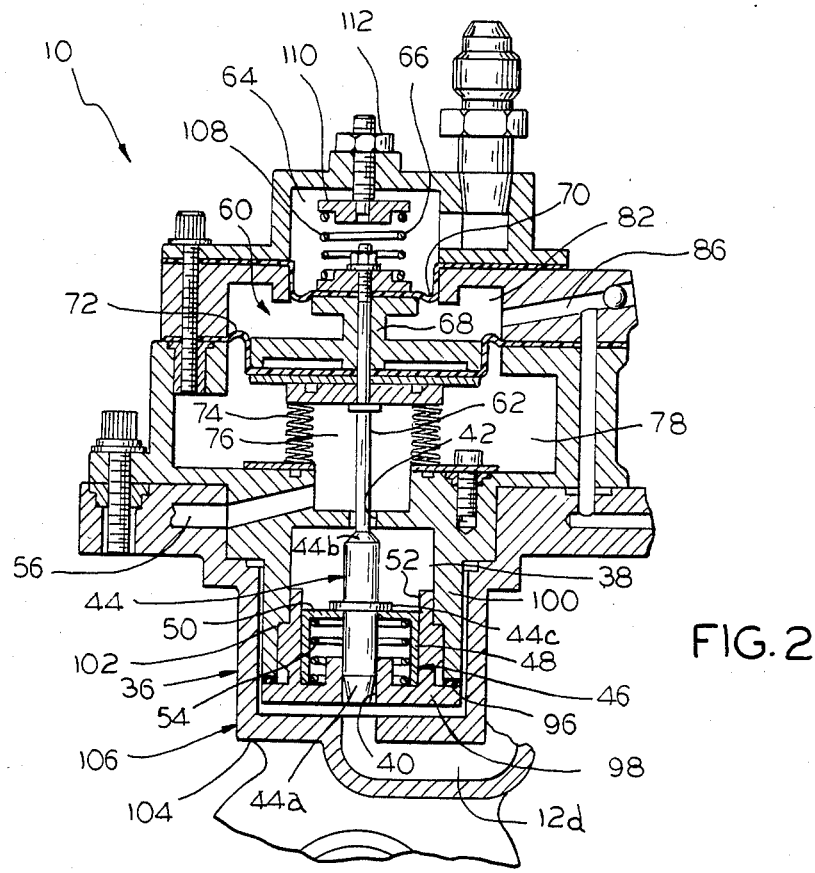
FIG. 2 is a sectional view of the pilot operated valve utilized in the system of FIG. 1.
Figure 3:
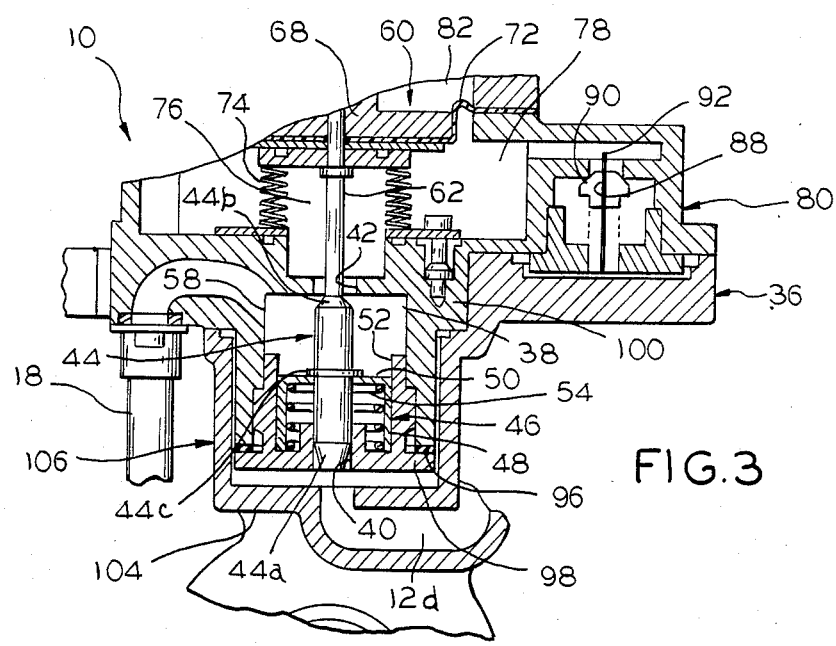
FIG. 3 is a sectional view of the pilot operated valve of FIG. 2 illustrating an integral control valve including a spring biased poppet for use therewith.

Referring now to FIGS. 2 and 3, the details of construction of the pilot operated valve 10 can be understood in greater detail. It includes a valve body 36 having a cavity 38 with a first port 40 generally concentric with and axially spaced from a second port 42 at opposite ends of the cavity 38. With this arrangement, the first port 40 is adapted to be subjected to fluid under pressure from the inlet pilot signal line 12 for biasing a poppet 44 in the cavity 38 toward the second port 42.

As shown in FIGS. 2 and 3, the poppet 44 extends between and is axially movable relative to the first and second ports 40 and 42, respectively. It will be seen that the poppet 44 has a first end 44a for lapped sealing engagement with the first port 40 and a second end 44b for lapped sealing engagement with the second port 42. During operation, the poppet 44 is axially positionable in the cavity 38 in a nearly zero lapped position, i.e., not sealed, relative to the first and secon dports 40 and 42, respectively.

As shown, the poppet 44 is preferably of substantially constant diameter for economical manufacturing. However, the first and second ends 44a and 44b, respectively, are fructoconical in shape and may have different slopes to obtain the proper gain characteristics for the valve. In addition, the poppet 44 may include an integral or welded ring 44c intermediate the ends 44a and 44b, respectively.

As will be appreciated, the poppet 44 is an elongated cylindrical valve member generally concentric with the first and second ports 40 and 42, respectively. The substantially uniform diameter of the poppet 44 closely approximates the diameter of the first and second ports 40 and 42, respectively, so that the opposing ends 44a and 44b are adapted for sliding insertion into the first and second ports and the generally conically tapered surfaces of the opposing ends 44a and 44b are positionable relative to the first and second ports so as to control the gain characteristics of the valve during operation thereof. With this arrangement, the poppet 44 accommodates flow of a portion of the fluid from the first port 40, through the cavity 38, and through the second port 42 in the nearly zero lapped position thereof.

Still referring to FIGS. 2 and 3, the pilot operated valve 10 includes a poppet guide 46 in the cavity 38 having a cylindrical outer wall 48 terminating at one end in a radially inwardly projecting portion 50 adapted to cooperate with the ring 44c of the poppet 44 for axial movement therewith. Moreover, as shown, the cylindrical wall 48 cooperates with an inner wall 52 for sliding movement of the poppet guide 46 within the cavity 38 and means are provided in the body 36 for biasing the poppet guide 46 in the same direction as the direction of biasing of the fluid from the inlet pilot signal line 12 in the form of a helical coil spring 54.

Referring to FIG. 2 in particular, the second port 42 is in communication with a vent 56 adapted to receive fluid from the inlet pilot signal line 12 under selected conditions, and the pilot operated valve 10 also includes a third port 58 in communication with the cavity 38 which uses the fluid from the inlet pilot signal line 12 at selected pressures (see FIG. 3). In other words, when the poppet 44 is biased to a nearly zero lapped position, part of the fluid from the inlet pilot signal line 12 passes through the vent 56 and part of the fluid from the inlet pilot signal line 12 passes through the third port 58 to be supplied to the actuator 16 through the line 18 (see FIG. 1).

Referring once again to FIG. 2, the pilot operated valve 10 includes means in the body for biasing the poppet 44 in a direction opposite the direction of biasing of the fluid under pressure from the inlet pilot signal line 12. The biasing means preferably includes a displaceable diaphragm assembly 60 spaced from and operatively joined to the poppet 44 by means of an axially extending rod 62 that contacts the end 44b of the poppet 44. When the diaphragm assembly 60 is displaced, the poppet 44 moves in response to such displacement.

The diaphragm assembly 60 defines a first chamber 64 in the body 36 isolated and spaced from the cavity 38 and adapted for communication with a fluid pressure signal carried by the outlet pilot signal line 14 (see FIG. 1). This fluid pressure signal controls the position of the poppet 44 relative to the first and second ports 40 and 42, respectively, through the diaphragm assembly 60. In particular, the fluid pressure signal from the outlet pilot signal line 14 biases the diaphragm assembly 60 in a direction opposite the direction of biasing of the fluid under pressure from the inlet pilot signal line 12 on the poppet 44. Moreover, separate adjustable means is provided in the chamber 64 in the form of an adjustable spring assembly 66 for biasing the diaphragm assembly 60 in the same direction as the direction of biasing of the fluid pressure signal from the outlet pilot signal line 14.

Still more particularly, the diaphragm assembly 60 includes a rigid piston 68 axially spaced from the poppet 44 and joined to the body 36 for limited axial movement by means of pair of flexible diaphragm members 70 and 72. In addition, a bellows assembly 74 joins the diaphragm assembly 60 to the body 36 for limited axial movement and defines a second cavity 76 in the body 36 through which the second port 42 is in communication with the vent 56.

As will be appreciated, the chamber 64 is on one side of the diaphragm assembly 60 and the second cavity 76 is on the other side of the diaphragm assembly. The poppet 44 is axially spaced from the diaphragm assembly 60 and is coaxial with the diaphragm assembly and the bellows assembly 74 through which the axially extending rod 62 engages the end 44b of the poppet 44. In a preferred embodiment, the diaphragm members 70 and 72 are elastomeric rolling diaphragms, the bellows assembly 74 is a flexible metal bellows, and the poppet guide 46 is the only source of sliding friction in the pilot operated valve 10.

As further shown in FIG. 2, the pilot operated valve 10 includes a second chamber 78 defined in part by the diaphragm assembly 60. The second chamber 78 is isolated and spaced from the cavity 38 and the first chamber 64 and is adapted for communication with a second fluid pressure signal comprising a part of the fluid under pressure from the inlet pilot signal 12 passing through the intermediate line 12e and a control valve 80 (see FIGS. 1 and 3) to act on the other side of the diaphragm assembly 60, i.e., on the side opposite the fluid pressure signal from the outlet pilot signal line 14 supplied to the chamber 64. As will be appreciated, the second fluid pressure signal causes the diaphragm assembly 60 to be displaced in a direction opposite the direction of the fluid pressure signal from the outlet pilot signal line 14.

As will now be apparent, the position of the poppet 44 relative to the first and second ports 40 and 42, respectively, is determined by a number of factors. First, the fluid under pressure from the inlet pilot signal line 12 will cooperate with the spring biased poppet guide 46 to move the poppet 44 from a closed position toward a nearly zero lapped position. Next, the fluid pressure signal in the second chamber 78 will also tend to move the poppet 44 toward the nearly zero lapped position. However, the control valve 80, which supplies fluid pressure to the chamber 78, provides a controlled restriction to the chamber 78 to provide a fixed valve opening ramp rate, i.e., the poppet 44 will move from the closed position illustrated in FIGS. 2 and 3 to the nearly zero lapped position at a controlled rate. Next, the fluid pressure signal acting in the first chamber 64 will cooperate with the spring assembly 66 so as to tend to move the poppet 44 toward the closed position. Finally, when the pilot operated valve 10 reaches a balanced, steady state condition, the poppet 44 will remain in the nearly zero lapped position.

Preferably, a third chamber 82 is also provided in the body 36 between the first and second chambers 64 and 78, respectively. The third chamber 82 is defined inpart by the first and second diaphragm members 70 and 72 and is adapted for communication with a third fluid pressure signal from a torque motor-flapper valve 84 (see FIG. 1) provided by a part of the fluid from the inlet pilot signal line 12 through the intermediate line 12f and acting on one of the diaphragm members 72 in the same direction as the fluid pressure signal from the outlet pilot signal line 14 in the chamber 64. As shown, the third fluid pressure signal is supplied to the chamber 82 through a line 86 extending through the body 36.

While the cavities 38 and 76 are in communication through the second port 42, the chambers 64, 78, and 82 are isolated from the cavities 38 and 76 and one another. This allows the first, second, and third fluid pressure signals in the respective chambers 64, 78, and 82 to act independently on the diaphragm assembly 60 to thereby control the position of the poppet 44 relative to the first and second ports 40 and 42, respectively. As a result, the pilot operated valve 10 provides unique control features as will be described in detail hereinafter.

As shown in FIG. 3, the control valve 80 is integral with the pilot operated valve 10. The function of the control valve 80 is to provide a controlled restriction to the second chamber 78 such that an orifice 88 in a spring biased poppet 90 in the control valve will supply fluid under pressure to the second chamber 78 at a desired flow rate such that depending upon the volume of the second chamber 78, a fixed ramp rate of fluid pressure is supplied to the actuator 16 thereby controlling the opening of a valve operated by the actuator to provide a downstream pressure ramp rate over the operating band of the system. If desired, a wire 92 can be installed through the orifice 88 and entrapped to provide a self-cleaning feature.

With this understanding of the invention, the chamber 64 is pressurized by fluid from the outlet pilot signal line 14. The outlet pilot signal line 14 is preferably a downstream sensing tube, i.e., a tube communicating with a fluid passageway downstream of a valve controlled by the actuator 16, and increases in downstream pressure will cause a movement in the poppet 44 toward a closed position. As will be appreciated, such movement of the poppet 44 will result in less fluid pressure being supplied to the actuator 16 and the valve controlled by the actuator will be moved toward a closed position.

As previously discussed, the chamber 78 is sized along with the control orifice 88 to establish the required pressure ramp rate. This ramp rate exists only during increased inlet pressure, i.e., during start-up when fluid is initially supplied through the inlet pilot signal line 12, and not during the transient conditions of speed control. After the initial rise in pressure, the chamber 78 will be at constant pressure unless inlet pressure drops.

Finally, the chamber 82 is supplied with fluid pressure through the torque motor-flapper valve 84 which receives input from a controller to control the speed of a fluid driven operating system. The effect of pressurizing and varying the pressure in the chamber 82 is to cause a change, i.e., an initial reduction and later reductions and increases, within the limit of the set point of the pilot operated valve 10 to thereby cause desired speed effects. In a non-speed control mode, the chamber 82 will be vented to ambient through a vent 94 and the pilot operated valve 10 will be operating at the set point, i.e., at the maximum operating pressure.

In the preferred embodiment, the pilot operated valve 10 is of a modular construction which includes the integral control valve 80, as shown in FIG. 3. The modular construction permits the spacing between the first and second ports 40 and 42 respectively, to be selectively set thereby achieving adjustment of the flow of a portion of the fluid from the first port 40, through the cavity 38, and through the second port 42 to vary the gain characteristics thereof when the poppet 44 is in a nearly zero lapped position relative to the first and second ports. In addition, the operating characteristics of the modular pilot operated valve 10 can be varied by externally adjusting the diaphragm assembly 60 to selectively set the biasing force thereof.

Referring in particular to FIGS. 2 and 3, the means for selectively setting the spacing between the first and second ports 40 and 42, respectively, includes the use of one or more shims 96. The modular pilot operated valve 10 includes a first body portion 98 and a second body portion 100 together defining the cavity 38. As illustrated, the first port 40 is provided in the first body portion 98 and the second port 42 is in the second body portion 100. The modular pilot operated valve 10 also accommodates relative telescopic movement between the first body portion 98 and the second body portion 100. Within the limits of the mating shoulders as at 102 and the bottom wall 104 of the casing 106, one or more shims 96 can be disposed between the first and second body portions 98 and 100, respectively, to determine the relative position of telescopic adjustment therebetween.

With regard to the spring assembly 66, FIG. 2 illustrates that a helical coil spring 108 is disposed between the top of the rigid piston 68 and a spring retaining plate 110 held in a selected position of adjustment within the chamber 64 by means of a threaded fastener 112. It will be appreciated that the threaded fastener 112 may be threadingly advanced inwardly or outwardly relative to the chamber 64 to increase or decrease the force of the helical coil spring 108 on the diaphragm assembly 60 and, thus, the set point which determines the maximum operating pressure. As a result, the modular pilot operated valve 10 can be conveniently adjusted by means of one or more shims 96 to vary the gain characteristics of the poppet 44 or by means of the spring assembly 66 to vary the set point of the valve by changing the biasing force of the diaphragm assembly 60 on the poppet 44.

With the modular construction of the pilot operated valve 10 as described, the components can be easily adjusted and assembled for use with the actuator 16. It will also be appreciated, particularly by referring to FIG. 2, that the pilot operated valve 10 is of reduced length which is achieved by using differential areas for the movable surfaces of the diaphragm assembly 60 and by expanding the diameter of the chamber 78 relative to the other chambers and cavities to obtain the required volume to provide a fixed valve opening ramp rate. Moreover, once the pilot operated valve 10 has been adjusted and assembled, the only remaining steps are bolting the modular assembly onto a housing for the actuator 16 and connecting the various fluid pressure lines as illustrated.

While in the foregoing there has been set forth a preferred embodiment of the invention, it is to be understood that the invention is only to be limited by the spirit and scope of the appended claims.

I claim:

1. A pilot operated valve comprising:
   a valve body;
   a cavity in said body;
   a first port formed in said body at one end of said cavity and a second port formed in said body at the other end of said cavity, said first port being generally concentric with and axially spaced from said second port;
   a poppet in said cavity extending between said first and second ports, said poppet being axially movable in said cavity relative to said first and second ports, said poppet having a first end for lapped sealing engagement with said first port and a seocnd end for lapped sealing engagement with said second port, said poppet being axially positionable in said cavity so as to simultaneously be in a nearly zero lapped position relative to both of said first and second ports, said poppet being an elongated cylindrical valve member generally concentric with said first and second ports and having a uniform diameter substantially along its entire length less than but closely approximating the diameter of said first and second ports;
   means for subjecting one of said ports formed in said body to a fluid under pressure, said fluid pressure subjecting means supplying fluid under pressure to said one of said ports for biasing said poppet toward the other of said ports; and
   means in said body for biasing said poppet in a direction opposite the direction of biasing of said fluid pressure subjecting means;
   said poppet accommodating flow of said fluid from the one of said ports, through said cavity, and through the other of said ports in said nearly zero lapped position thereof.

2. The pilot operated valve of claim 1 wherein said poppet has opposing ends adapted for sliding insertion into said first and second ports, said opposing ends having generally conically tapered surfaces for controlling the gain characteristics of said valve.

3. The pilot operated valve of claim 1 including a poppet guide in said cavity axially movable with said poppet, and means in said body for biasing said poppet guide and said poppet in the same direction as the direction of biasing of said fluid.

4. A pilot operated valve comprising:
   a valve body;
   a cavity in said body;
   a first port formed in said body at one end of said cavity and a second port formed in said body at the other end of said cavity;
   a poppet in said cavity extending between said first and second ports, said poppet being movable in said cavity relative to said first and second ports;
   means for subjecting one of said ports formed in said body to a fluid under pressure, said fluid pressure subjecting means supplying fluid under pressure to said one of said ports for biasing said poppet toward the other of said ports, and the other of said ports formed in said body being in communication with a vent adapted to receive said fluid under selected conditions;
   a third port in communication with said cavity adapted to use said fluid at a selected pressure;
   means in said body for biasing said poppet in a direction opposite the direction of biasing of said fluid pressure subjecting means, said biasing means including a displaceable diaphragm assembly spaced from and directly operatively joined to said poppet by means in engagement therewith and with said diaphragm assembly, said poppet moving in response to displacement of said diaphragm assembly;
   chamber means in said body defined in part by said diaphragm assembly, said chamber means being isolated from said cavity and adapted for communication with means for providing a fluid pressure signal, said fluid pressure signal means controlling at least in part the position of said poppet relative to said first and second ports through said diaphragm assembly; and
   a bellows assembly defining a second cavity in said body, said second port being in communication with said vent through said second cavity, said bellows assembly joining said diaphragm assembly to said body.

5. The pilot operated valve of claim 4 wherein said fluid pressure signal biases said diaphragm assembly in a direction opposite the direction of biasing of said poppet by said fluid pressure subjecting means and including separate adjustable means in said chamber means for applying a biasing force to said diaphragm assembly acting in the same direction as the direction of said biasing force applied by said fluid pressure signal means.

6. The pilot operated valve of claim 4 wherein said diaphragm assembly includes a rigid piston axially spaced from said poppet, said piston being operatively joined to said poppet by an axially extending rod adapted to engage one end of said poppet, said axially extending rod comprising said means in engagement with said poppet and said diaphragm assembly, said diaphragm assembly also including a flexible diaphragm member joining said rigid piston to said body.

7. The pilot operated valve of claim 5 wherein said chamber means is on one side of said diaphragm assembly and said second cavity is on the other side of said diaphragm assembly, said poppet being axially spaced from said diaphragm assembly and being coaxial with said diaphragm assembly and said bellows assembly, said diaphragm assembly being operatively joined to said poppet by a rod extending axially through said second cavity in engagement with one end of said poppet, said axially extending rod comprising said means in engagement with said poppet and said diaphragm assembly.

8. A pilot operated valve comprising:
a valve body;
a cavity in said body;
a first port formed in said body at one end of said cavity and a second port formed in said body at the other end of said cavity;
a poppet in said cavity extending between said first and second ports, said poppet being movable in said cavity relative to said first and second ports;
means for subjecting one of said ports formed in said body to a fluid under pressure, said fluid pressure subjecting means supplying fluid under pressure to said one of said ports for biasing said poppet toward the other of said ports;
means in said body for biasing said poppet in a direction opposite the direction of biasing of said fluid pressure subjecting means, said biasing means including a displaceable diaphragm assembly spaced from and directly operatively joined to said poppet by means in engagement therewith and with said diaphragm assembly, said poppet moving in response to displacement of said diaphragm assembly;
first chamber means in said body defined in part by said diaphragm assembly, said first chamber means being isolated from said cavity and adapted for communication with means for providing a first fluid pressure signal to act on one side of said diaphragm assembly, said first fluid pressure signal means causing said diaphragm assembly to be displaced in one direction relative to said poppet; and
second chamber means in said body defined in part by said diaphragm assembly, said second chamber means being isolated from said cavity and said first chamber emans and adapted for communication with means for providing a second fluid pressure signal to act on the other side of said diaphragm assembly, said second fluid pressure signal means causing said diaphragm assembly to be displaced in the opposite direction relative to said poppet;
said first and second fluid pressure signal means controlling at least in part the position of said poppet relative to said first and second ports through said diaphragm assembly;
said poppet being an elongated cylindrical valve member generally concentric with said first and second ports and having auniform diameter substantially along its entire length less than but closely approximating the diameter of said first and second ports, said fluid from the one of said ports passing through a vent in communication with the other of said ports under selected conditions, and a third port in communication with said cavity adapted to use said fluid at selected pressures maintained by the position of said poppet relative to said first and second ports through said first and second fluid pressure signal means acting on said diaphragm assembly.

9. The pilot operated valve of claim 8 wherein said first fluid pressure signal means biases said diaphragm assembly in a direction opposite the direction of biasing of said fluid on said poppet, said second fluid pressure signal means biasing said diaphragm assembly in a direction opposite the direction of biasing of said first fluid pressure signal means, and including separate adjustable means in said first chamber means for biasing said diaphragm assembly in a direction the same as the direction of biasing of said first fluid pressure signal means.

10. The pilot operated valve of claim 8 wherein said first chamber means is on one side of said diaphragm assembly and said second chamber means is on the other side of said diaphragm assembly, said diaphragm assembly including a rigid piston axially spaced from and operatively joined to said poppet by an axially extending rod adapted to engage one end of said poppet, said axially extending rod comprising said means in engagement with said poppet and said diaphragm assembly, said diaphragm assembly also including at least one flexible diaphargm member joining said rigid piston to said body for limited axial displacement toward and away from said poppet responsive to the relative biasing forces of said fluid, first fluid pressure signal means, second fluid pressure signal means, and separate adjustable biasing means.

11. A pilot operated valve comprising:
a valve body;
a cavity in said body;
a first port formed in said body at one end of said cavity and a second port formed in said body at the other end of said cavity;
a poppet in said cavity extending between said first and second ports, said poppet being movable in said cavity relative to said first and second ports;
means for subjecting one of said ports formed in said body to a fluid under pressure, said fluid pressure subjecting means supplying fluid under pressure to said one of said ports for biasing said poppet toward the other of said ports;
means in said body for biasing said poppet in a direction opposite the direction of biasing of said fluid pressure subjecting means, said biasing means including a displaceable diaphragm assembly having first and second flexible diaphragm members spaced from one another and said poppet and directly operatively joined to said poppet by means in engagement therewith and with said diaphragm assembly, said poppet moving in response to displacement of said diaphragm assembly;

first chamber means in said body defined in part by one of said diaphargm members, said first chamber means adapted for communication with means for providing a first fluid pressure signal acting on the one of said diaphargm members in one direction relative to said poppet, said first fluid pressure signal means causing said diaphragm assembly to be displaced in the one direction;

second chamber means in said body defined in part by the other of said diaphragm members, said second chamber means adapted for communication with means for providing a second fluid pressure signal acting on the other of said diaphragm members in the opposite direction relative to said poppet, said second fluid pressure signal means causing said diaphragm assembly to be displaced in the opposite direction; and third chamber means in said body between said first and second chamber means, said third chamber means being defined in part by said first and second diaphragm members and adapted for communication with means for providing a third fluid pressure signal acting on the one of said diaphragm members in the same direction as said first fluid pressures signal means, said third fluid pressure signal causing said diaphragm assembly to be displaced in the one direction relative to said poppet;

said chamber means being isolated from said cvity and one another;

said first, second and third fluid pressure signal means controlling at least in part the position of said poppet relative to said first and second ports through said diaphragm assembly.

12. The pilot operated valve of claim 11 wherein said first port is generally concentric with and axially spaced from said second port, said poppet being axially movable in said cavity and having a first end for lapped sealing engagement with said first port and a second end for lapped sealing engagement with said second port, said second port being in communication with a vent, said poppet being axially positionable in said cavity in a nearly zero lapped position relative to said first and second ports, said poppet accommodating flow of said fluid from said first port, through said cavity, and through said second port in said nearly zero lapped position thereof, and including a third port in communication with said cavity adapted to use said fluid at selected pressures.

13. The pilot operated valve of claim 12 including a bellows assembly defining a second cavity in said body, said second port being in communication with said vent through said second cavity, said bellows assembly joining said diaphragm assembly to said body, said first chamber means being on one side of said diaphragm assembly and said second cavity being on the other side of said diaphragm assembly surrounded by said second chamber means, said poppet being axially spaced from said diaphragm assembly and coaxial with said diaphragm assembly and said bellows assembly, said diaphragm assembly being operatively joined to said poppet by a rod extending axially through said second cavity in engagement with one end of said poppet, said axially extending rod comprising said means in engagement with said poppet and said diaphragm assembly.

14. The pilot operated valve of claim 11 wherein said first and third fluid pressure signal means bias said diaphragm assembly in a direction opposite the direction of biasing of said bluid on said poppet, said second fluid pressure signal means biasing said diaphragm assembly in a direction opposite the direction of biasing of said first fluid pressure signal means and including separate adjustable means in said first chamber means for biasing said diaphragm assembly in a direction the same as the direction of biasing of said first fluid pressure signal means.

15. The pilot operated valve of claim 11 wherein said poppet is an elongated cylindrical valve member generally concentric with said first and second ports and having a uniform diameter substantially along its entire length less than but closely approximating the diameter of said first and second ports, said fluid from the one of said ports passing through a vent in communication with the other of said ports under selected conditions, and a third port in communication with said cavity adapted to use said fluid at selected pressures maintained by the position of said poppet relative to said first and second ports through said first, second, and third pressure signal means acting on said diaphragm assembly.

16. The pilot operated valve of claim 11 wherein said first chamber means is on one side of said one of said diaphragm members remote from the other of said diaphragm members and said second chamber means is on one side of the other of said diaphragm members remote from said one of said diaphragm members and said third chamber means is located between said diaphragm members, said diaphragm assembly including a rigid piston axially spaced from and operatively joined to said poppet by an axially extending rod adapted to engage one end of said poppet, said axially extending rod comprising said means in engagement with said poppet and said diaphragm assembly, and including separate adjustable means in said first chamber means for biasing the diaphragm assembly in a direction the same as the direction of biasing of said first fluid pressur signal means, said diaphragm members joining said rigid piston to said body for limited axial displacement toward and away from said cavity responsive to the relative biasing forces of said fluid, first fluid pressure signal means, second fluid pressure signal means, third fluid pressure signal means, and separate adjustable biasing means.

* * * * *